United States Patent
Kotlicki et al.

(10) Patent No.: US 10,032,362 B2
(45) Date of Patent: *Jul. 24, 2018

(54) DUAL COMMUNICATION-INTERFACE FACILITY MONITORING AND MANAGEMENT SYSTEM AND METHOD

(71) Applicant: Tyco Fire & Security GmbH, Neuhausen am Rheinfall (CH)

(72) Inventors: Oren Kotlicki, Ramat Ha'Sharon (IL); Yaacov Kotlicki, Ramat-Gan (IL); Mota Zussman, Tel Aviv (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,106

(22) Filed: Dec. 8, 2016

(65) Prior Publication Data

US 2017/0103645 A1    Apr. 13, 2017

Related U.S. Application Data

(63) Continuation of application No. 13/770,111, filed on Feb. 19, 2013, now Pat. No. 9,548,943.
(Continued)

(51) Int. Cl.
*G08B 29/02* (2006.01)
*H04Q 9/00* (2006.01)
(Continued)

(52) U.S. Cl.
CPC ........... *G08B 29/02* (2013.01); *G08B 25/009* (2013.01); *H04L 49/15* (2013.01); *H04Q 9/00* (2013.01); *H04Q 2209/43* (2013.01)

(58) Field of Classification Search
CPC ........ G08B 13/19645; G08B 13/19693; G08B 13/1436; G08B 13/19608;
(Continued)

(56) References Cited

U.S. PATENT DOCUMENTS

2001/0048030 A1  12/2001  Sharood et al.
2002/0078198 A1   6/2002  Buchbinder et al.
(Continued)

FOREIGN PATENT DOCUMENTS

WO   2010019624 A1   2/2010

OTHER PUBLICATIONS

Extended European Search Report for European Application No. 13752113.4, dated Dec. 4, 2015. Eight pages.
(Continued)

*Primary Examiner* — Kabir A Timory
(74) *Attorney, Agent, or Firm* — HoustonHogle LLP

(57) ABSTRACT

A dual communication-interface facility monitoring and management system, the system including a multiplicity of facility monitoring\management devices, the devices including at least one of at least one facility monitoring sensor and at least one facility management device, the facility monitoring sensors being operative to monitor it least a part of a facility, the facility management devices being operative to manage at last part of the facility, a facility communication gateway operative to facilitate electronic communication between as local area network (LAN) associated with the facility and an a wide area network (WAN) external to the facility, and a dual communication-interface facility monitoring and management subsystem operative to communicate with each of the multiplicity of devices via at least one of a first multiplicity of communication protocols and to communicate with the facility communication gateway via at least one of a second multiplicity of communication protocols.

27 Claims, 2 Drawing Sheets

Related U.S. Application Data

(60) Provisional application No. 61/600,738, filed on Feb. 20, 2012.

(51) Int. Cl.
*G08B 25/00* (2006.01)
*H04L 12/933* (2013.01)

(58) Field of Classification Search
CPC ........ G08B 13/19621; G08B 13/19689; G08B 29/02; G08B 25/0009; H04L 49/15; H04Q 9/00
See application file for complete search history.

(56) References Cited

U.S. PATENT DOCUMENTS

| | | |
|---|---|---|
| 2004/0003073 A1 | 1/2004 | Krzyzanowski et al. |
| 2008/0057976 A1 | 3/2008 | Rae et al. |
| 2008/0168283 A1 | 7/2008 | Penning |
| 2009/0165114 A1 | 6/2009 | Baum et al. |
| 2009/0227224 A1 | 9/2009 | Aftelak et al. |
| 2010/0010944 A1 | 1/2010 | Cheng et al. |
| 2010/0023865 A1 | 1/2010 | Fulker et al. |
| 2010/0277300 A1 | 11/2010 | Cohn et al. |
| 2012/0017012 A1 | 1/2012 | Bartholomay et al. |
| 2012/0311657 A1 | 12/2012 | Boldyrev et al. |
| 2012/0331088 A1 | 12/2012 | O'Hare et al. |
| 2013/0097306 A1 | 4/2013 | Dhunay |
| 2013/0147623 A1 | 6/2013 | Somasundaram et al. |
| 2013/0343196 A1 | 12/2013 | Swedo |

OTHER PUBLICATIONS

International Search Report and Written Opinion, dated Jun. 10, 2013, from International Application No. PCT/IL2013/050150, filed on Feb. 19, 2013. Seven pages.

DUAL COMMUNICATION-INTERFACE FACILITY MONITORING AND MANAGEMENT SYSTEM AND METHOD

REFERENCE TO RELATED APPLICATIONS

This application is a Continuation of U.S. application Ser. No. 13/770,111, filed on Feb. 19, 2013, which claims the benefit under 35 USC 119 (e) of U.S. Provisional Application No. 61/600,738 filed on Feb. 20, 2012, both of which are incorporated herein by reference in their entirety.

FIELD OF THE INVENTION

The present invention relates generally to facility monitoring and management systems and methods of operation thereof.

BACKGROUND OF THE INVENTION

Today's residences and public facilities typically employ security and facility management systems which may comprise multiple monitoring and management devices, all of which being connected to a network. Due to the diverse nature of these devices, a multiplicity of communication paradigms and protocols needs to be employed.

SUMMARY OF THE INVENTION

The present invention seeks to provide a dual communication-interface facility monitoring and management system and a method of operation thereof.

There is thus provided in accordance with a preferred embodiment of the present invention a dual communication-interface facility monitoring and management system, the system including a multiplicity of facility monitoring\management devices, the multiplicity of facility monitoring\management devices including at least one of at least one facility monitoring sensor and at least one facility management device, the at least one facility monitoring sensor being operative to monitor at least a part of a facility, the at least one facility management device being operative to manage at last part of the facility, a facility communication gateway operative to facilitate electronic communication between a local area network (LAN) associated with the facility and an a wide area network (WAN) external to the facility, and a dual communication-interface facility monitoring and management subsystem operative to communicate with each of the multiplicity of facility monitoring\management devices via at least one of a first multiplicity of communication protocols and to communicate with the facility communication gateway via at least one of a second multiplicity of communication protocols.

Preferably, the dual communication-interface facility monitoring, and management subsystem is also operative to receive facility monitoring information collected by the at least one facility monitoring sensor and to communicate the facility monitoring information to a user employing a communicator device connected to the local area network via the facility communication gateway. Additionally or alternatively, the dual communication-interface facility monitoring and management subsystem is operative to receive facility monitoring information collected by the at least one facility monitoring sensor and to communicate the facility monitoring information to a user employing a communicator device connected to the wide area network via the facility communication gateway.

Preferably, the dual communication-interface facility monitoring and management subsystem is also operative to receive at least one facility management instruction from a user employing a communicator device connected to the local area network via the facility communication gateway and to communicate the at least one facility management instruction to the at least one facility management device. Additionally or alternatively, the dual communication-interface facility monitoring and management subsystem is operative to receive at least one facility management instruction from a user employing a communicator device connected to the wide area network via the facility communication gateway and to communicate the at least one facility management instruction to the at least one facility management device.

In accordance with a preferred embodiment of the present invention, the first multiplicity of communication protocols and the second multiplicity of communication protocols are at least partially mutually exclusive.

Preferably, the at least one facility monitoring sensor is a security camera. Alternatively, the at least one facility monitoring sensor is a motion detector. Preferably, the at least one facility management device is a remote controlled light dimmer.

Preferably, the first multiplicity of communication protocols includes at least one of Z-Wave, ZigBee, PowerG and DECT-ULE. Preferably, communication between the dual communication-interface facility monitoring and management subsystem and the facility monitoring\management devices is at least one of wired or wireless.

Preferably, the second multiplicity of communication protocols includes at least one of Wi-Fi, 3G\LTE cellular protocols and DECT ULE. Preferably, communication between the dual communication-interface facility monitoring and management subsystem and the facility communication gateway is at least one of wired or wireless.

Preferably, the dual communication-interface facility monitoring and management subsystem is implemented in a USB adaptor device. Preferably, the USB adaptor device is mounted on a USB mounting device which is inserted into an electric wall socket, thereby providing electric power to the dual communication-interface facility monitoring and management subsystem. Alternatively, the USB adaptor device is mounted on a USB mounting device which is wire connected to the facility communication gateway. Alternatively, the USB adaptor device is inserted into an appropriate USB port in the facility communication gateway for direct communication therewith.

Preferably, the dual communication-interface facility monitoring and management system is operative to communicate with a central cloud service management platform, the central cloud service management platform being operable for receiving monitoring signals received from the at least one facility monitoring sensor via the dual communication-interface facility monitoring and management subsystem and the facility communication gateway of the dual communication-interface facility monitoring and management system, and to provide corresponding alerts to a manager of the facility.

Preferably, the dual communication-interface facility monitoring and management system is operative to communicate with a central cloud service management platform, the central cloud service management platform being operable to relay facility management instructions to the at least one facility management device of the facility via the facility communication gateway and the dual communication-interface facility monitoring and management subsystem of the dual communication-interface facility monitoring and management system.

There is also provided in accordance with another preferred embodiment of the present invention a dual communication-interface facility monitoring and management method, the method including communicating with each of a multiplicity of facility monitoring\management devices via at least one of a first multiplicity of communication protocols and communicating with a facility communication gateway via at least one of a second multiplicity of communication protocols, the multiplicity of facility monitoring\management devices including at least one of at least one facility monitoring sensor and at least one facility management device, the at least one facility monitoring sensor being operative to monitor at least a part of a facility, the at least one facility management device being operative to manage at last part of the facility, and the facility communication gateway being operative to facilitate electronic communication between a local area network (LAN) associated with the facility and an a wide area network (WAN) external to the facility.

Preferably, the communicating with each of the multiplicity of facility monitoring\management devices includes receiving facility monitoring information collected by the at least one facility monitoring sensor and communicating the facility monitoring information to a user employing a communicator device connected to the local area network via the facility communication gateway. Additionally or alternatively, the communicating with each of the multiplicity of facility monitoring\management devices includes receiving facility monitoring information collected by the at least one facility monitoring sensor and communicating the facility monitoring information to a user employing a communicator device connected to the wide area network via the facility communication gateway.

Preferably, the communicating with each of the multiplicity of facility monitoring\management devices includes receiving at least one facility management instruction from a user employing a communicator device connected to the local area network via the facility communication gateway and to communicate the at least one facility management instruction to the at least one facility management device. Additionally or alternatively, the communicating with each of the multiplicity of facility monitoring\management devices includes receiving at least one facility management instruction from a user employing a communicator device connected to the wide area network via the facility communication gateway and to communicate the at least one facility management instruction to the at least one facility management device.

In accordance with a preferred embodiment of the present invention, the first multiplicity of communication protocols and the second multiplicity of communication protocols are at least partially mutually exclusive.

Preferably, the at least one facility monitoring sensor is a security camera. Alternatively, the at least one facility monitoring sensor is a motion detector. Preferably, the at least one facility management device is a remote controlled light dimmer.

Preferably, the first multiplicity of communication protocols includes at least one of Z-Wave, ZigBee, PowerG and DECT-ULE. Preferably, the communicating with each of a multiplicity of facility monitoring\management devices is at least one of wired or wireless.

Preferably, the second multiplicity of communication protocols includes at least one of Wi-Fi, 3G\LTE cellular protocols and DECT ULE. Preferably, the communicating with a facility communication gateway is at least one of wired or wireless.

Preferably, the method also includes communicating monitoring signals received from the at least one facility monitoring sensor of the facility to a central cloud service, the central cloud service operable for providing corresponding alerts to a manager of the facility. Preferably, the method also includes communicating with a central cloud service management platform, the central cloud service management platform being operable to relay facility management instructions from a manager of the facility to the at least one facility management device of the facility.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
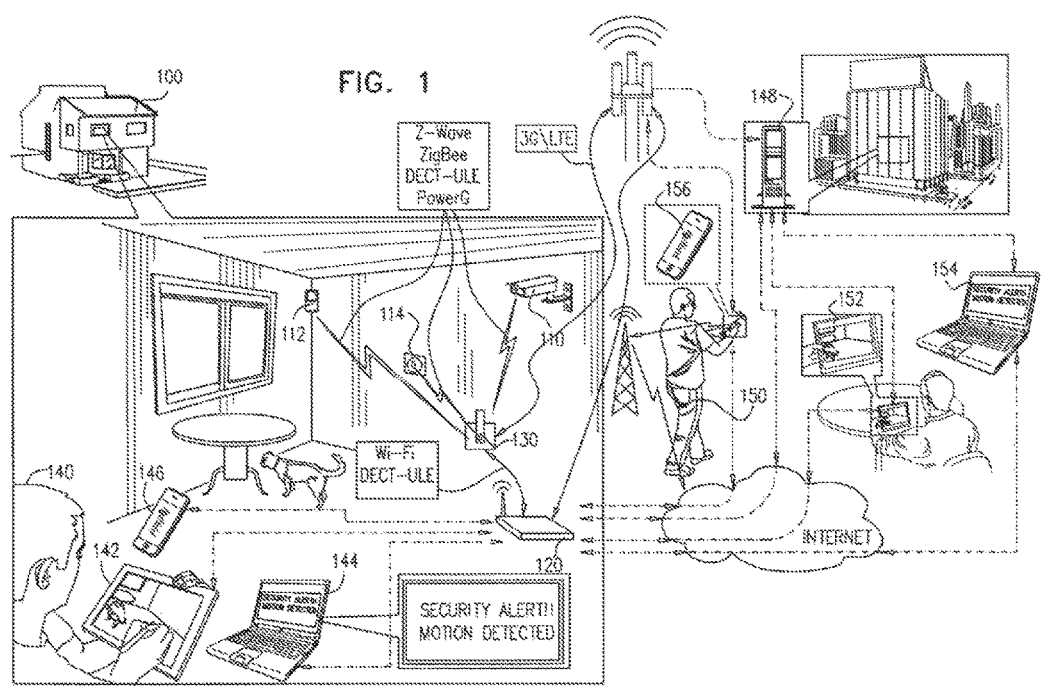
FIG. 1 is a simplified pictorial illustration of an example of the operation of a dual communication-interface facility monitoring and management system, operative in accordance with a preferred embodiment of the present invention.

Reference is now made to FIG. 1, which is a simplified pictorial illustration of the operation of a dual communication-interface facility monitoring and management system, operative in accordance with a preferred embodiment of the present invention. The dual communication-interface facility monitoring and management system of FIG. 1 is preferably suitable for monitoring and managing a facility such as, for example, a residence 100.

The dual communication-interface facility monitoring and management system preferably includes a multiplicity of facility monitoring\management devices, each of the facility monitoring\management devices being one of a facility monitoring sensor and a facility management device. In the example of FIG. 1, the dual communication-interface facility monitoring and management system includes facility monitoring sensors such as a camera 110 and a motion detector 112, and a facility management device such as a remote controlled light dimmer 114. It is appreciated that additional facility monitoring sensors such as, for example, glass break detectors, door and window sensors, may be also be employed. It is also appreciated that additional facility management devices such as, for example, remote controlled temperature regulating devices and remote controlled door and window controllers, may also be employed.

As further shown in FIG. 1, a facility communication gateway 120 is preferably provided fir facilitating electronic communication between a local area network (LAN) associated with residence 100 and an a wide area network (WAN) typically external to the residence. The WAN may be, for example, the internet or a segment thereof. It is appreciated that facility communication gateway 120 may be, for example, a commercially available interact router having wireless internet capabilities.

The dual communication-interface facility monitoring and management system of FIG. 1 preferably also includes a dual communication-interface facility monitoring, and management subsystem 130 operative to communicate with each of the multiplicity of facility monitoring\management devices 110, 112 and 114 via at least one of a first multiplicity of communication protocols. The first multiplicity of communication protocols may include, for example, Z-Wave, ZigBee and DECT-ULE. Dual communication-interface facility monitoring and management subsystem 130 and facility monitoring\management devices 110, 112 and 114 may also be part of a POWERG® Wireless Property Protection system commercially available from VISONIC® Ltd. of Tel Aviv, Israel. It is appreciated that communication between dual communication-interface facility monitoring and management subsystem 130 and facility monitoring\management devices 110, 112 and 114 may be wired or wireless.

Dual communication-interface facility monitoring and management subsystem 130 is also preferably operative to communicate with facility communication gateway 120 via at least one of a second multiplicity of communication protocols. The second multiplicity of communication protocols may include, for example, Wi-Fi, 3G\LTE cellular protocols and DECT ULE. As shown in FIG. 1, when communicating via 3G\LTE cellular protocols, a cellular telephone network external to facility 100 is typically employed, it is appreciated that communication between dual communication interface facility monitoring and management subsystem 130 and facility communication gateway 120 may be wired or wireless.

Dual communication-interface facility monitoring and management subsystem 130 is preferably implemented in a USB adaptor device. In the example of FIG. 1, a USB adaptor device implementing dual communication-interface facility monitoring and management subsystem 130 is mounted on a suitable USB mounting device which is inserted into an electric wall socket, thereby providing electric power to dual communication-interface facility monitoring and management subsystem 130. As shown in FIG. 1, and as described hereinabove, it is appreciated that the USB adaptor device implementing dual communication-interface facility monitoring and management subsystem 130 may communicate with facility communication gateway 120 via any of the second multiplicity of communication protocols which includes, for example, Wi-Fi, 3G\UTE cellular protocols and DECT ULE.

Alternatively, the USB adaptor device implementing dual communication-interface facility monitoring and management subsystem 130 may be inserted into a USB mounting device, which USB mounting device is in turn wire connected to communication gateway 120.

Yet alternatively, the USB adaptor device implementing dual communication-interface facility monitoring and management subsystem 130 may be inserted into an appropriate USB port in facility communication gateway 120 for direct communication therewith.

It is appreciated that dual communication-interface facility monitoring and management subsystem 130 is not limited to being implemented on a USB device, and may alternatively be implemented on any other suitable computer device.

It is a particular feature of the present invention that dual communication-interface facility monitoring and management subsystem 130 is operative to employ two at least partially mutually exclusive sets of communication protocols for communicating with respective multiplicity of facility monitoring\management devices 110, 112 and 114 and with facility communication gateway 120.

The dual communication-interface facility monitoring and management system of the present invention is preferably operable for communicating security information relating to a facility to a user of the dual communication-interface facility monitoring and management system, and for facilitating remote management of the facility by the user.

In the example of FIG. 1, a user 140 employing a tablet computer device 142 receives a video feed captured by camera 110 via dual communication-interface facility monitoring and management subsystem 130 and via facility communication gateway 120, which video feed comprises a real time video image of a section of residence 100. It is appreciated that user 140 may he located within another section of residence 100 and that tablet computer device 142 may communicate with facility communication gateway 120, for example, via Wi-Fi.

As further shown in the example of FIG. 1, user 140 employing a laptop computer 144 may receive a security alert generated by motion detector 112 via dual communication-interface facility monitoring and management subsystem 130 and via facility communication gateway 120, which security alert is generated responsive to motion detector 112 detecting motion with a section of residence 100 monitored by motion detector 112. It is appreciated that user 140 may be located within another section of residence 100 and that laptop computer 144 may communicate with facility communication gateway 120, for example, via Wi-Fi.

As yet further shown in the example of FIG. 1, user 140 employing a smartphone 146 such as, for example, an IPHONE®, may utilize a suitable smartphone application to send an instruction via facility communication gateway 120 and via dual communication-interface facility monitoring and management subsystem 130 to remote controlled light dimmer 114, which instruction instructs remote controlled light dimmer 114 to dim the lights in a section of residence 100. It is appreciated that user 140 may be located within another section of residence 100 and that smartphone 146 may communicate with facility communication gateway 120, for example, via Wi-Fi.

Additionally, a central cloud service management platform 148 is preferably provided for monitoring signals received from each of facility monitoring sensors installed at any of a plurality of residences 100 via dual communication interface facility monitoring and management subsystem 130 and via facility communication gateway 120 associated therewith, and to provide corresponding alerts to owners of residences 100 who have subscribed to the services provided by central cloud service management platform 148.

Central cloud service management platform 148 is also preferably operative, for example, to relay facility management instructions to any facility management devices installed at any of the plurality of residences 100 via facility communication gateway 120 and via dual communication-interface facility monitoring and management subsystem 130 associated therewith.

As shown in the example of FIG. 1, a user 150 located outside of residence 100 and employing a tablet computer device 152 may receive a video feed captured by camera 110 via dual communication-interface facility monitoring and management subsystem 130 of residence 100, facility communication gateway 120 of residence 100 and cloud service management platform 148, which video feed comprises a real time video image of a section of residence 100. It is appreciated that tablet computer device 152 may also communicate directly with facility communication gateway 120 of residence 100 via the internet.

As further shown in the example of FIG. 1, user 150 located outside of residence 100 and employing a laptop computer 154 may receive a security alert generated by motion detector 112 via dual communication interface facility monitoring and management subsystem 130 of residence 100, facility communication gateway 120 of residence 100 and cloud service management platform 148, which security alert is generated responsive to motion detector 112 detecting motion with as section of residence 100 monitored by motion detector 112. It is appreciated that laptop computer 154 may also communicate directly with facility communication gateway 120 of residence 100 via the Internet.

As yet further shown in the example of FIG. 1, user 150 located outside of residence 100 and employing smartphone 156 may communicate over a cellular telephone network with central cloud service management platform 148. User 150 may, for example, utilize a suitable smartphone application to send an instruction via cloud service management platform 148, facility communication gateway 120 and dual communication-interface facility monitoring and management subsystem 130 to remote controlled light dimmer 114 of residence 100, which instruction instructs remote controlled light dimmer 114 to dim the lights in a section of residence 100.

Figure 2:
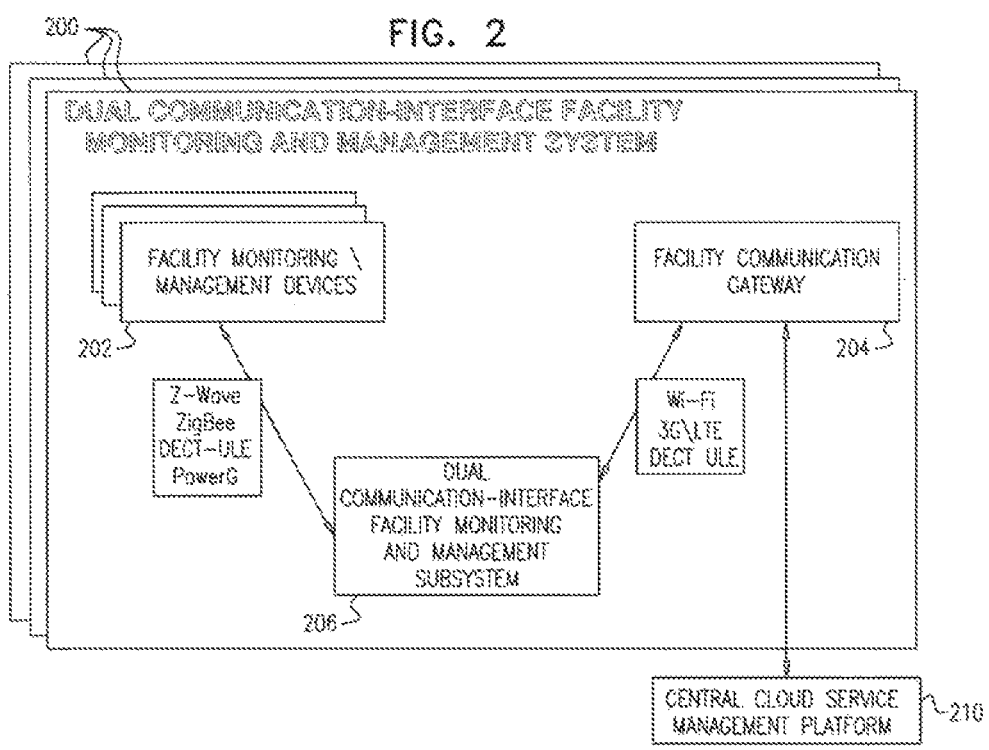
FIG. 2 is a simplified block diagram illustration of the dual communication-interface facility monitoring and management system of FIG. 1.

Reference is now made to FIG. 2, which is a simplified block diagram illustration of the dual communication-interface facility monitoring and management system of FIG. 1. As shown in FIG. 2, dual communication-interface facility monitoring and management system 200 includes a multiplicity of facility monitoring management devices 202, each of the facility monitoring and management devices being one of a facility monitoring sensor and as facility management device, the facility monitoring sensor being operative to monitor at least a part of the facility, the facility management device being operative to manage at last part of the facility.

Preferably, system 200 also includes a facility communication gateway 204 operative to facilitate electronic communication between a local area network (LAN) associated with said facility and an in wide area network (WAN) external to said facility.

Preferably, system 200 also includes a dual communication-interface facility monitoring and management subsystem 206 operative to communicate with each of multiplicity of facility monitoring\management devices 202 via at least one of a first multiplicity of communication protocols and to communicate with facility communication gateway 204 via at least one of a second multiplicity of communication protocols.

For example, as described hereinabove with reference to FIG. 1, the first multiplicity of communication protocols may include, for example, Z-Wave, ZigBee and DECT-ULE. Dual communication-interface facility monitoring and management subsystem 206 and facility monitoring\management devices 202 may also be part of a POWERG® Wireless Property Protection system commercially available from VISONIC® Ltd. of Tel Aviv, Israel. The first multiplicity of communication protocols may include for example 3G\LTE cellular protocols and DECT ULE.

A central cloud service management platform 210 is also preferably provided for monitoring signals received from each of facility monitoring\management devices 202 of systems 200 associated therewith via dual communication-interface facility monitoring and management subsystem 206 and facility communication gateway 204, and to provide corresponding alerts to users of associated systems 200 who have subscribed to the services provided by central cloud service management platform 210.

Central cloud service management platform 210 is also preferably operative, for example, to relay facility management instructions to any of facility monitoring\management devices 202 of systems 200 associated therewith, via facility communication gateway 204 and dual communication-interface facility monitoring and management subsystem 206.

It will be appreciated by persons skilled in the art that the present invention is not limited by what has been particularly shown and described hereinabove. Rather the scope of the present invention includes both combinations and sub-combinations of the various features described hereinabove as well as modifications thereof which would occur to persons skilled in the art upon reading the foregoing description and which are not in the prior art.

The invention claimed is:

1. A dual communication-interface facility monitoring and management system, said system comprising:
 a multiplicity of security system components comprising at least one of:
  at least one security camera;
  at least one motion detector; and
  at least one remote controlled light dimmer;
 a facility communication gateway operative to facilitate electronic communication between a local area network (LAN) associated with a facility and a wide area network (WAN) external to said facility; and
 a dual communication-interface facility monitoring and management subsystem operative to directly communicate information with each of said multiplicity of security system components via at least one of a first multiplicity of communication protocols and to communicate said information with said facility communication gateway via at least one of a second multiplicity of communication protocols, said dual communication-interface facility monitoring and management subsystem being implemented in a Universal Serial Bus (USB) adaptor device, said USB adaptor device being configured for insertion into a USB port.

2. The dual communication-interface facility monitoring and management system according to claim 1 and wherein said dual communication-interface facility monitoring and management subsystem is also operative to receive facility monitoring information collected by said at least one facility monitoring sensor and to communicate said facility monitoring information to a user employing a communicator device connected to said local area network via said facility communication gateway.

3. The dual communication-interface facility monitoring and management system according to claim 1 and wherein said dual communication-interface facility monitoring and management subsystem is also operative to receive facility monitoring information collected by said at least one facility monitoring sensor and to communicate said facility monitoring information to a user employing a communicator device connected to said wide area network via said facility communication gateway.

4. The dual communication-interface facility monitoring and management system according to claim 1 and wherein said dual communication-interface facility monitoring and management subsystem is also operative to receive at least one facility management instruction from a user employing a communicator device connected to said local area network via said facility communication gateway and to communicate said at least one facility management instruction to at least one of said multiplicity of security system components.

5. The dual communication-interface facility monitoring and management system according to claim 1 and wherein said dual communication-interface facility monitoring and management subsystem is also operative to receive at least one facility management instruction from a user employing a communicator device connected to said wide area network via said facility communication gateway and to communicate said at least one facility management instruction to at least one of said multiplicity of security system components.

6. The dual communication-interface facility monitoring and management system according to claim 1 and wherein said first multiplicity of communication protocols and said second multiplicity of communication protocols are at least partially mutually exclusive.

7. The dual communication-interface facility monitoring and management system according to claim 1 and wherein said first multiplicity of communication protocols comprises at least one of Z-Wave, ZigBee, PowerG and DECT-ULE.

8. The dual communication-interface facility monitoring and management system according to claim 1 and wherein communication between said dual communication-interface facility monitoring and management subsystem and said multiplicity of security system components is at least one of wired or wireless.

9. The dual communication-interface facility monitoring and management system according to claim 1 and wherein said second multiplicity of communication protocols comprises at least one of Wi-Fi, 3G\LTE cellular protocols and DECT ULE.

10. The dual communication-interface facility monitoring and management system according to claim 1 and wherein communication between said dual communication-interface facility monitoring and management subsystem and said facility communication gateway is at least one of wired or wireless.

11. The dual communication-interface facility monitoring and management system according to claim 1 and wherein said USB adaptor device is mounted on a USB mounting device which is inserted into an electric wall socket, thereby providing electric power to said dual communication-interface facility monitoring and management subsystem.

12. The dual communication-interface facility monitoring and management system according to claim 1 and wherein said USB adaptor device is mounted on a USB mounting device which is wire connected to said facility communication gateway.

13. The dual communication-interface facility monitoring and management system according to claim 1 and wherein said USB adaptor device is inserted into an appropriate USB port in said facility communication gateway for direct communication therewith.

14. The dual communication-interface facility monitoring and management system according to claim 1 and wherein said dual communication-interface facility monitoring and management system is operative to communicate with a central cloud service management platform, said central cloud service management platform being operable for receiving monitoring signals received from said at least one facility monitoring sensor via said dual communication-interface facility monitoring and management subsystem and said facility communication gateway of said dual communication-interface facility monitoring and management system, and to provide corresponding alerts to a manager of said facility.

15. The dual communication-interface facility monitoring and management system according to claim 1 and wherein said dual communication-interface facility monitoring and management system is operative to communicate with a central cloud service management platform, said central cloud service management platform being operable to relay facility management instructions to at least one of said multiplicity of security system components of said facility via said facility communication gateway and said dual communication-interface facility monitoring and management subsystem of said dual communication-interface facility monitoring and management system.

16. A dual communication-interface facility monitoring and management method, said method comprising:
employing a USB adaptor device, said USB adaptor device being configured for insertion into a USB port, for directly communicating information with each of a multiplicity of security system components via at least one of a first multiplicity of communication protocols and communicating said information with a facility communication gateway via at least one of a second multiplicity of communication protocols, said multiplicity of security system components comprising at least one of at least one security camera, at least one motion detector and at least one remote controlled light dimmer;
said facility communication gateway being operative to facilitate electronic communication between a local area network (LAN) associated with said facility and a wide area network (WAN) external to said facility.

17. The dual communication-interface facility monitoring and management method according to claim 16 and wherein said communicating with each of said multiplicity of security system components comprises receiving facility monitoring information collected by said at least one facility monitoring sensor and communicating said facility monitoring information to a user employing a communicator device connected to said local area network via said facility communication gateway.

18. The dual communication-interface facility monitoring and management method according to claim 16 and wherein said communicating with each of said multiplicity of security system components comprises receiving facility monitoring information collected by said at least one facility monitoring sensor and communicating said facility monitoring information to a user employing a communicator device connected to said wide area network via said facility communication gateway.

19. The dual communication-interface facility monitoring and management method according to claim 16 and wherein said communicating with each of said multiplicity of security system components comprises receiving at least one facility management instruction from a user employing a communicator device connected to said local area network via said facility communication gateway and to communicate said at least one facility management instruction to at least one of said multiplicity of security system components.

20. The dual communication-interface facility monitoring and management method according to claim 16 and wherein said communicating with each of said multiplicity of security system components comprises receiving at least one facility management instruction from a user employing a communicator device connected to said wide area network via said facility communication gateway and to communicate said at least one facility management instruction to at least one of said multiplicity of security system components.

21. The dual communication-interface facility monitoring and management method according to claim 16 and wherein said first multiplicity of communication protocols and said second multiplicity of communication protocols are at least partially mutually exclusive.

22. The dual communication-interface facility monitoring and management method according to claim 16 and wherein said first multiplicity of communication protocols comprises at least one of Z-Wave, ZigBee, PowerG and DECT-ULE.

23. The dual communication-interface facility monitoring and management method according to claim 16 and wherein said communicating with each of said multiplicity of security system components is at least one of wired or wireless.

24. The dual communication-interface facility monitoring and management method according to claim 16 and wherein said second multiplicity of communication protocols comprises at least one of Wi-Fi, 3G\LTE cellular protocols and DECT ULE.

25. The dual communication-interface facility monitoring and management method according to claim 16 and wherein said communicating with a facility communication gateway is at least one of wired or wireless.

26. The dual communication-interface facility monitoring and management method according to claim 16 and also comprising communicating monitoring signals received from said at least one facility monitoring sensor of said facility to a central cloud service, said central cloud service operable for providing corresponding alerts to a manager of said facility.

27. The dual communication-interface facility monitoring and management method according to claim 16 and also comprising communicating with a central cloud service management platform, said central cloud service management platform being operable to relay facility management instructions from a manager of said facility to at least one of said multiplicity of security system components of said facility.

* * * * *